United States Patent [19]

McRae

[11] 4,146,841
[45] Mar. 27, 1979

[54] TECHNIQUE FOR COMBATTING JITTER IN MULTIPLE PHASE TRANSMISSION SYSTEM

[75] Inventor: Daniel D. McRae, West Melbourne, Fla.

[73] Assignee: Harris Corporation, Cleveland, Ohio

[21] Appl. No.: 837,444

[22] Filed: Sep. 28, 1977

[51] Int. Cl.$^2$ ............................................ H04L 27/22
[52] U.S. Cl. .................................... 325/320; 329/110
[58] Field of Search ........................ 325/30, 42, 45, 65, 325/320, 480, 344; 329/110, 112, 136; 178/67, 88

[56] References Cited

U.S. PATENT DOCUMENTS

| | | | |
|---|---|---|---|
| 3,675,129 | 7/1972 | Melvin | 325/320 |
| 3,727,134 | 4/1973 | Melvin | 325/320 |
| 3,983,499 | 9/1976 | Tan | 325/320 |

Primary Examiner—John C. Martin
Attorney, Agent, or Firm—Craig & Antonelli

[57] ABSTRACT

To eliminate the effects of phase jitter, successively measured phase values received in an N-phase transmission system are stored and compared with a phase node reference plot to derive values representative of the respective phase nodes to which the measured phase values are closest and the degree of deviation from these "closest" phase node values. The degree of deviation for a prescribed number of successive phase measurements is averaged over this number to obtain a mean phase error. The successive phase deviations are then adjusted by this mean deviation and, based upon the adjusted deviation values, the originally chosen node values may be changed to one of their immediately adjacent nodes. This process is carried out for each phase measurement in the sequence, so as to obtain a phase adjustment factor, by which each of the respective nodes relative to what the measured phase values were originally measured is shifted. This shifting effectively rotates the phase node reference plot by an amount which minimizes the mean square error of the phase node measurements for the prescribed number of phase measurements. The difference between the adjusted node values of the two adjacent phases located midway in the sequence is then taken to determine the transmitted symbol for that point in the transmission.

The above process is then continuously repeated for successive sequences of prescribed numbers of phase measurements by advancing through the successive measurements one at a time and making whatever adjustments are necessary on the phase node reference plot after each sequence analysis.

26 Claims, 4 Drawing Figures

TECHNIQUE FOR COMBATTING JITTER IN MULTIPLE PHASE TRANSMISSION SYSTEM

FIELD OF THE INVENTION

The present invention is directed to communication systems, and particularly to a system for accurately decoding data symbols represented by differential phase modulation in a multiple phase shift keyed communication system, wherein the influence of phase jitter in carrying out the decoding is reduced.

BACKGROUND OF THE INVENTION

In the transmission of multiple phase-shift keyed (MPSK) signals, phase jitter caused by the transmission medium is a common problem. To reduce the performance loss caused by phase jitter, differential MPSK is often used, wherein the difference between the phases of two successive symbols, rather than the absolute phases of the symbols themselves, represents the information. This differential technique also avoids the necessity of establishing and maintaining a phase reference, a task which is often difficult in MPSK systems due to "node slips" in the reference.

In receiving and decoding MPSK signals, two approaches are commonly employed. The simplest is to take the difference between successive received phases and then compare this phase difference with a set of threshold values to decide upon the transmitted symbols. This technique results in a loss of 3dB in the signal to noise ratio relative to a coherent receiving system, since noise perturburances in both received phases add to perturb the difference. A second approach is to establish a coherent phase reference and make individual phase node decisions based on the reference, and then logically take the difference between these decisions to establish which symbols were actually transmitted. In many cases, this latter approach is preferable, since only one phase error is associated with each nodal decision.

Now, if the second approach is used on signals wherein phase jitter is present, it is conventional to use a phase-locked loop to attempt to track out the jitter, so that the effect of the jitter on the nodal decisions will be minimized. Since phase error measurements are normally available in MPSK receivers even when data is being transmitted, it is not difficult to establish such a loop. A problem arises, however, when the jitter frequency and amplitude are such that a substantial phase can occur in a few symbol times. If the loop attempts to average the phase measurements to reduce the effects on the noise, it is unable to track the phase jitter close enough.

SUMMARY OF THE INVENTION

In accordance with the present invention, the above-described undesirable effects of phase jitter in the phase decisions are overcome by basing individual phase decisions upon phase averages of phase samples which are in the future as well as the past, relative to the points of decision, hence, eliminating the delay associated with the normal phase locked loop and significantly reducing tracking error.

More particularly, successively measured phase values received in an N-phase transmission system are stored and compared with a phase node reference plot to derive values representative of the respective nodes to which the measured phase values are closest and the degree of deviation from these "closest" node values. The degree of deviation for a prescribed number of successive phase measurements is averaged over this number to obtain a means phase error. The successive phase deviations are then adjusted by this mean deviation and, based upon the adjusted deviation values, the originally chosen node values may be changed to one of their immediately adjacent nodes. This process is carried out for each phase measurement in the sequence, so as to obtain a phase adjustment factor by which each of the respective nodes relative to what the measured phase values were originally measured is shifted. This shifting effectively rotates the phase node reference plot by an amount which minimizes the mean square error of the phase node measurements for the prescribed number of phase measurements. The difference between the adjusted node values of the two adjacent phases located midway in the sequence is then taken to determine the transmitted symbol for that point in the transmission.

The above process is then continuously repeated for successive sequences of prescribed numbers of phase measurements by advancing through the successive measurements one at a time and making whatever adjustments are necessary on the phase node reference plot after each sequence analysis.

DETAILED DESCRIPTION

Figure 1:
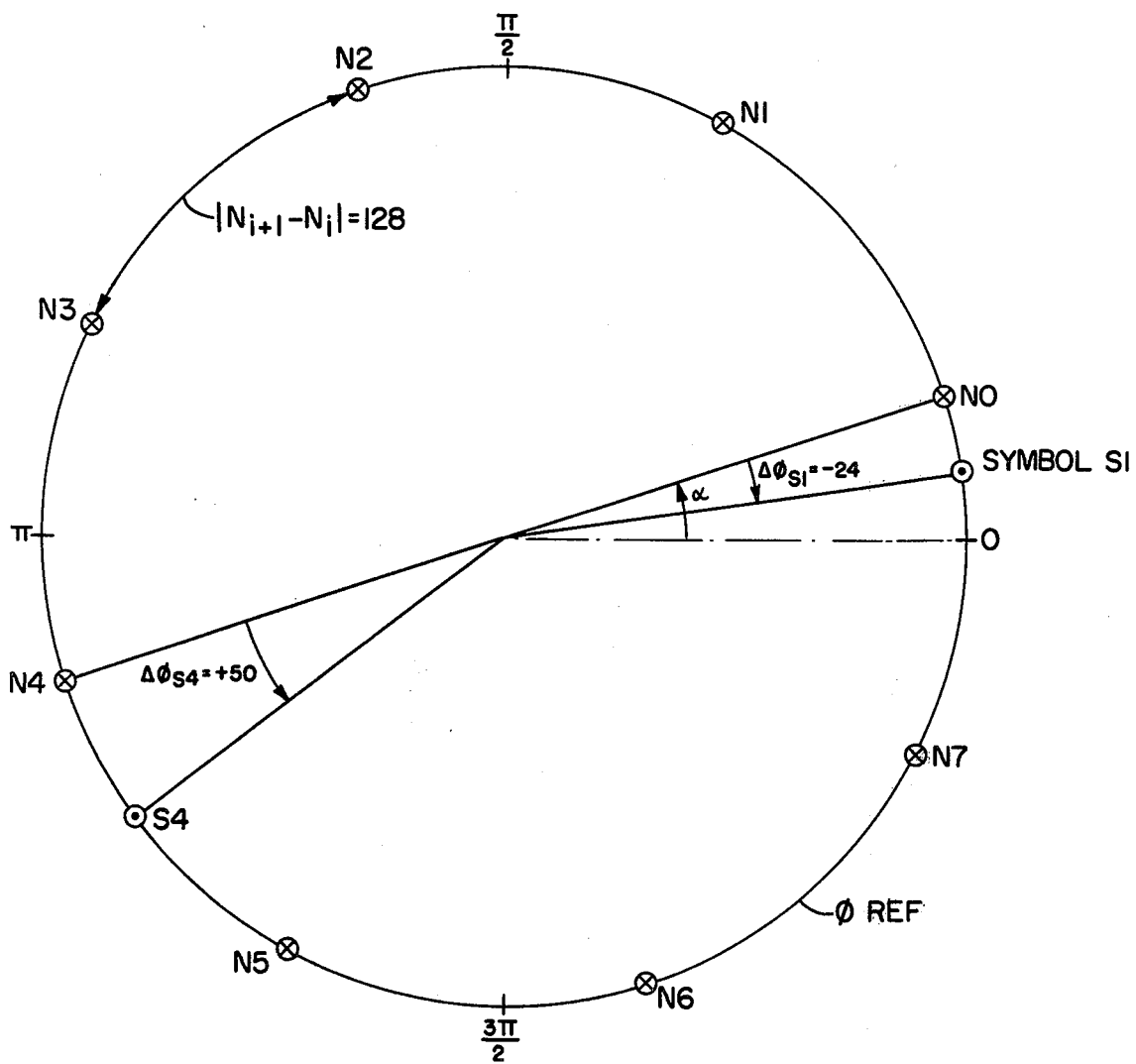
FIG. 1 is a phase diagram illustrating the relative locations of measured received phase values with respect to reference phase nodes.

While the present invention is applicable to an N-phase multiple phase communication system, the description of an exemplary embodiment to follow will treat its application to an eight phase system in which eight successive measured phase values are subjected to the mean square phase error minimizing technique for combatting phase jitter. In this regard, FIG. 1 shows the disposition of eight adjacent nodes N0 - N7, equally spaced around a reference circle, each phase node corresponding to one of the phase nodes to which a transmitted phase may correspond, subject to a shift of some angle $\alpha$ relative to the true location of the actually transmitted phase values. Namely, for an eight phase system, a transmitted phase may take on any of the phase values $0$, $\pi/4$, $\pi/2$, $3\pi/4$, $\pi$, $5\pi/4$, $3\pi/2$, and $7\pi/4$, using zero as the reference for the base phase value N0. However, at the receiver, the values of received phases will vary due to distortion, such as phase jitter, so that a reference phase plot containing each of the phase values N0 - N7 is not necessarily fixed at the values set at the transmitter, but is permitted to vary about the transmitter reference by a changeable deviation angle $\alpha$, which is adjusted to minimize the mean square phase error, as will be explained in detail below.

Now, at the receiver, signal values representative of each of the phase nodes N0 - N7 are stored and compared successively with each recovered phase value to determine to which phase node, on the variable reference circuit shown in FIG. 1, a respective phase is closest. For a digital implementation of the present invention, let it be assumed that the 45° spacing between each adjacent node corresponds to 128 arbitrary units. If the reference plot of FIG. 1 were coincident with that at the transmitter for generating the eight phase node values N0 - N7, then, using a ten bit, two's complement format, one could assign decimal values to the phase nodes as follows: N0 (0° or 0 rad) = 0; N1 (45° or $\pi 4$ rad) = 128; N2 (90° or $\pi/2$ rad) = 256; N3 (145° or $3\pi/4$ rad) = 384; N4 (180° or $\pi$rad) = −512; N5 (225° or $5\pi/4$ rad) = −384; N6 (270° or $3\pi/2$ rad) = −256; N7 (315° or $7\pi/4$ rad) = −128. Therefore, if $\alpha$ = 24.61°, the corresponding numerical shift will be a shift of $\alpha$ = 70, so that each of the values for N0 - N7 on the reference circle at the receiver will be shifted relative to those at the transmitter by this numerical value.

FIG. 1 also shows an exemplary symbol S1, measured at the receiver to have an absolute phase of 16.17° relative to zero degrees, so that symbol S1 lies between nodes N7 and N0. Converted into a numerical deviation, using the 128 unit spacing between nodes, this means that symbol S1 is 24 units clockwise from node N0 and 104 units counter-clockwise from node N7. Using the conventional polarity designation, symbol S1 is displaced −24 units from node N0 and +104 units from node N7. Thus, the node closest to symbol S1 is node N0. In accordance with the invention, initial phase measurement comparisons are carried out relative to a stored reference node plot and values representative of the node closest to each symbol phase and the deviation from the closest node are generated. Thus, using the reference plot shown in FIG. 1, for symbol S1, there are generated two values; a first indicating that the closest node is node N0, and a second indicating that the phase deviation of symbol S1 relative to this closest node N0 is the number −24. The same type of measurement is carried out for each successively received phase, so that two series of values are generated. These series are stored and then analyzed in sequences of a prescribed number of phase measurements in each series, advancing through the series symbol by symbol.

More particularly, for a series of symbols S1 - SN, there will be generated a first series of measured closest phase nodes $N_1$ - $N_N$ and phase deviations of the symbols from their respective nodes $\Delta\phi_1$ - $\Delta\phi_N$. Now, the measured values for a sequence of eight symbols $S_i$ - $S_{i+7}$ are subjected to a mean square phase error minimization process and, after any adjustment of the node values $N_i$ - $N_{i+7}$, the difference between nodes $N_{i+3}$ and $N_{i+4}$ is taken as a transmitted differential symbol value. Then, the process is shifted to the next eight symbols beginning with symbol $S_{i+1}$, so that it is carried out for symbols $S_{i+1}$ - $S_{i+8}$. In the description of the invention for an exemplary sequence, symbol S1, shown in FIG. 1, is the first or $S_i^{th}$ symbol in the sequence and symbol S4, shown in FIG. 1, is the $S_{i+3}^{th}$ or fourth symbol in the sequence. The other symbols, S2, S3, S5, S6, S7, and S8 have not been shown in FIG. 1 in order to simplify the drawing; however, arbitrary values for such symbols are tabulated below in Table 1.

TABLE 1

| Symbol | Closest Node | Phase Deviation to Closest Node |
| --- | --- | --- |
| S1 | N0 | −24 |
| S2 | N2 | +4 |
| S3 | N2 | −38 |
| S4 | N4 | +50 |
| S5 | N0 | −60 |
| S6 | N7 | +12 |

TABLE 1-continued

| Symbol | Closest Node | Phase Deviation to Closest Node |
| --- | --- | --- |
| S7 | N6 | −16 |
| S8 | N4 | −56 |

Figure 2:
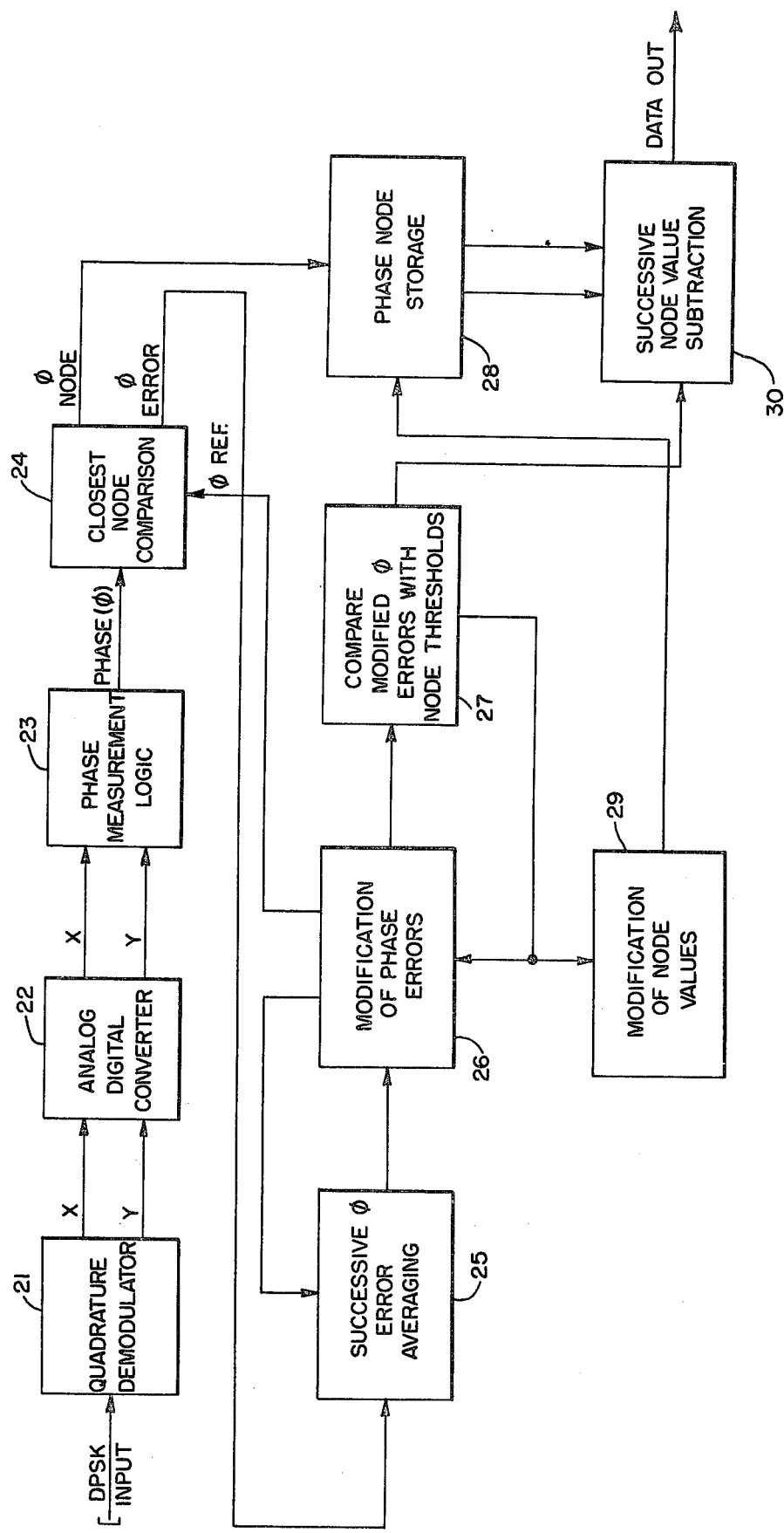
FIG. 2 is a block diagram illustrating a functional implementation of a system for combatting phase jitter in a multiple phase transmission communication network.

These symbol values have been obtained from and are subjected to processing in the system implementation of the invention shown in FIG. 2. Namely, a differential phase shift keyed input signal, the phase difference between adjacent phase symbols of which represents transmitted information, is applied to a conventional quadrature demodulator 21 from which respective X and Y components of each signal vector are obtained. These X and Y components are then converted into digital form in A - D converter 22 and applied to phase measurement logic circuit 23, from which a digital signal representative of the absolute phase of a received symbol signal vector is obtained. Components 21 - 23 are conventional and, per se, are not the subject matter of the present invention. The absolute phase value $\phi$ derived from phase measurement logic circuit 23 is then applied to a closest node comparison circuit 24, which compares the absolute phase of each symbol to the node values of an adjustable phase reference circle $\phi$REF. Thus, for the symbol S1 shown in FIG. 1, having the absolute phase of 16.17°, closest node comparison circuit 24 generates a first output signal identifying node N0 as the node on the reference circle $\phi$REF to which symbol S1 is closest, and a second output signal indicating that symbol S1 is 8.44° clockwise from node N0 or has a value of −24, using the number 128 to represent the absolute value of spacing between adjacent nodes.

As each successively transmitted phase symbol is received and subjected to the operations described above, there will be generated a series of values such as those for the eight symbols S1 - S8 tabulated in Table 1. These values are stored, and the phase error representative numbers for eight symbols are subjected to a mean error averaging process in successive phase error averaging circuit 25. Each of the stored numerical values for the phase deviation to closest node for symbols S1 - S8 are summed and divided by the number of symbols in the sequence being averaged (here eight). Therefore, the sum of the phase deviation values in Table 1 divided by the number of symbols S1 - S8 = −128/8 = −16. This average error (−16) is then subtracted from the phase deviation value for each symbol in modification of phase errors functional component 26 to derive a new set of phase deviations, as shown in Table 2.

TABLE 2

| Symbol | Modified Phase Deviations |
| --- | --- |
| S1 | −8 |
| S2 | +20 |
| S3 | −22 |
| S4 | +66 |
| S5 | −44 |
| S6 | +28 |
| S7 | 0 |
| S8 | −40 |

These modified phase deviations are supplied to functional circuit 27 for comparing the modified errors with node thresholds. More specifically, for the 45° or 128 unit spacing between the adjacent nodes of the eight phase node plot shown in FIG. 1, the proximity of the absolute phase measurement to a phase node can be effectively determined by observing which of the phase nodes has an absolute phase value which differs from that of the symbol by a number between ±64, since 64 is halfway between 128, the spacing between nodes. Thus, each of the phase deviations of Table 1 as a value in this ±64 range. After adjusting the phase error or phase deviation values, to zero the mean error and, consequently, the mean square error, for the eight successive symbols of the series being processed, the phase error deviation for one or more of the symbols may be outside the ±64 range. Moreover, it can be shown that if the adjusted phase error, for eight successive symbols, lies outside ⅞ of this range, then the originally chosen closest node for that symbol should be changed to the next node in the direction of the deviation from the originally chosen node. Namely, if the magnitude of the adjusted phase deviation is greater than 56, then the node $N_j$, chosen for that symbol, and stored in phase node storage circuit 28, should be changed to the node $N_{j-1}$ or $N_{j+1}$, depending upon the sign of the adjusted phase deviation. If the sign is positive, the node $N_{j+1}$ is chosen; if the sign of the deviation is negative, the node $N_{j-1}$ is chosen.

Looking at the example shown in Table 2, the phase deviation for symbol S4 exceeds the value 56 and has a positive sign. This indicates that the original choice for node N4 (j = 4) as being the estimated transmitted phase for symbol S4 should be changed to the node N5 (j+1 = 5). In response to this threshold decision, threshold comparison circuit 27 causes the original node estimate for symbol S4 to be changed by node value modification circuit 29 from node N4 to node N5. Therefore, in phase node storage circuit 28, the stored node estimate N4 for symbol S4 is changed to node N5. In addition, since changing the choice of a node necessarily changes the modified phase deviation for symbol S4, a node spacing deviation number is subtracted from the phase error deviation value for the deviation of symbol S4 relative to node N5. Therefore, since symbol S4 is now located clockwise relative to its closest node estimate N5, which is 128 units away from node N4, the number 128 is subtracted from the modified phase deviation for symbol S4 in Table 2 to yield a new modified phase deviation of +66 − 128 = −62 for symbol S4. Moreover, since adjustment of the phase deviation for symbol S4 will change the mean deviation for each of symbols S1 - S8, from the zeroed values shown in Table 2, the newly created mean deviation resulting from measuring symbol S4 relative to node N5 must be subtracted from each of the deviations S1 - S8. Thus deviation −128/8 = −16 yields a new set of phase deviations as tabulated in Table 3.

TABLE 3

| Symbol | Newly Modified Phase Deviations |
|---|---|
| S1 | + 8 |
| S2 | +36 |
| S3 | − 6 |
| S4 | −46 |
| S5 | −28 |
| S6 | +44 |
| S7 | +16 |
| S8 | −24 |

With the phase deviations having been readjusted to once again zero the mean phase error and consequently the mean sequence error, the successive deviations for symbols S1 - S8 are once again examined in node threshold comparison circuit 27 to determine whether there should again be a change in any of the choices for the node estimates presently stored in storage circuit 28. As it turns out, for the example described, none of the presently stored phase deviations for each of symbols S1 - S8 exceeds the ±56 threshold level which would cause the choice for the phase node for its respective symbol to be changed. It can be shown that for any series of n symbols, the original phase node estimate for each will be changed no more than once. In the present example, the original phase node estimate for only one symbol (S4) had to be changed in the process of zeroing the mean phase error for all eight symbols S1 - S8.

Now, comparing the phase deviation values plotted in Table 3 relative to those shown in Table 1, and taking into account the new choice for the phase node N5 for symbol S4, it can be seen that had original location of the phase mode reference circle been rotated by the amount of the total mean deviation, the presently decided upon node estimates and phase deviations for symbols S1 - S8 would have been obtained. When circuit 26 observes that all of the phase deviations for symbols S1 - S8 have been favorably compared by circuit 27 to be within the ±56 tolerance, it then adjusts the location of each of the phase nodes N0 - N7 on the reference circle by the total mean deviation required to finally zero the mean error for symbols S1 - S8, which total mean, in the example described, is the number −32. This total mean effectively rotates the reference circle 11.25° clockwise about its position prior to processing symbols S1 - S8. In addition, the difference between the finally selected phase nodes for symbols S4 and S5, i.e. S4 = N5 and S5 = N0, is obtained to yield the differential phase $5\pi/4$ which represents the information value at the middle of the series of symbols S1 - S8. Namely, the error in the choice of this information value has been minimized by zeroing the means value of phase errors in successive symbols in choosing those transmitted prior to as well as subsequent to the differential interval S4 - S5. Thus, the effects of phase jitter in the phase measurement process have been substantially reduced by zeroing the mean square error of phase deviations for successive symbols over a prescribed number of symbols.

Figure 3:
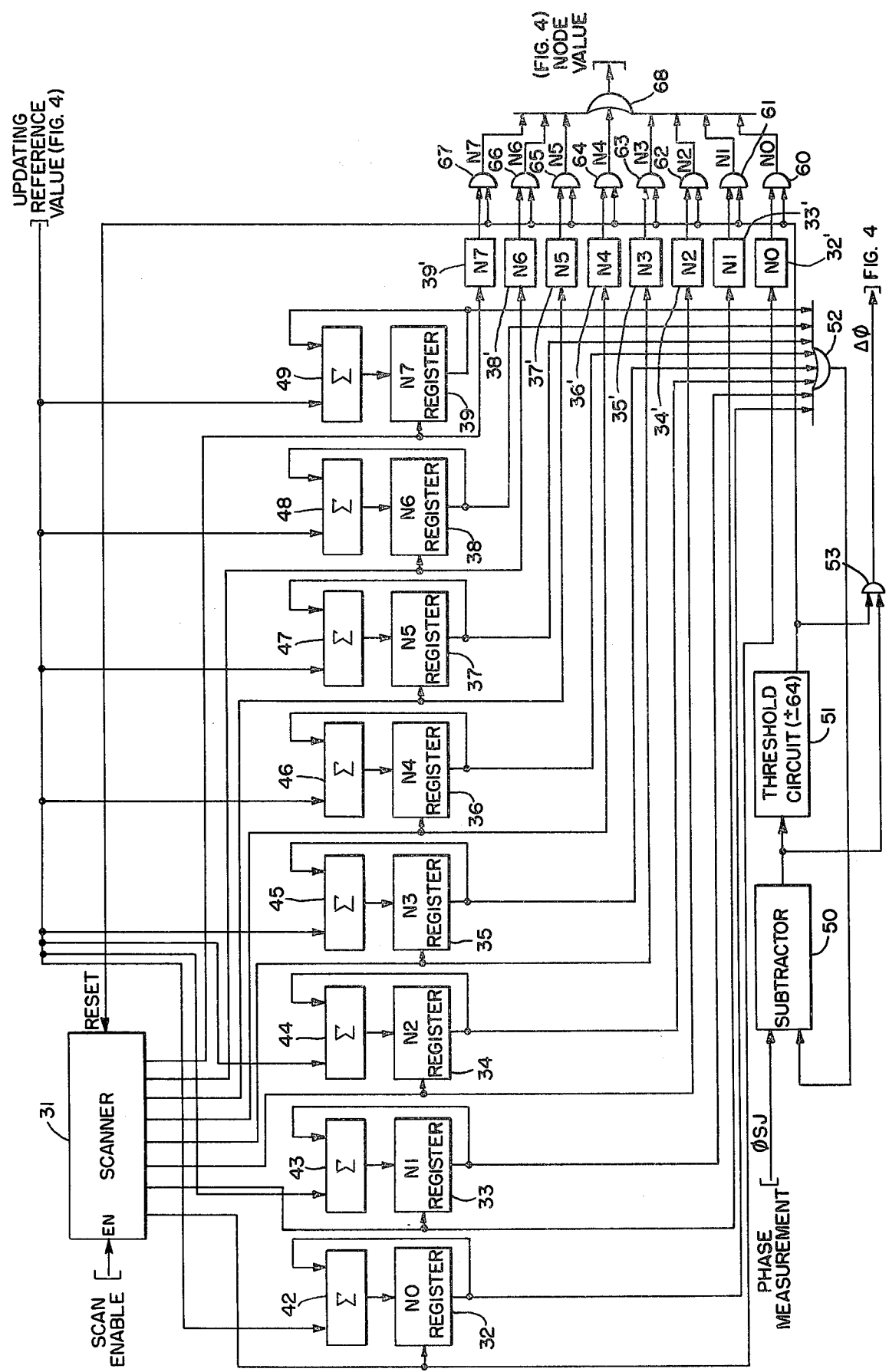
FIGS. 3 and 4 are detailed illustrations of a circuit implementation for carrying out phase measurement and averaging functions employed in the system shown in FIG. 2.
Figure 4:
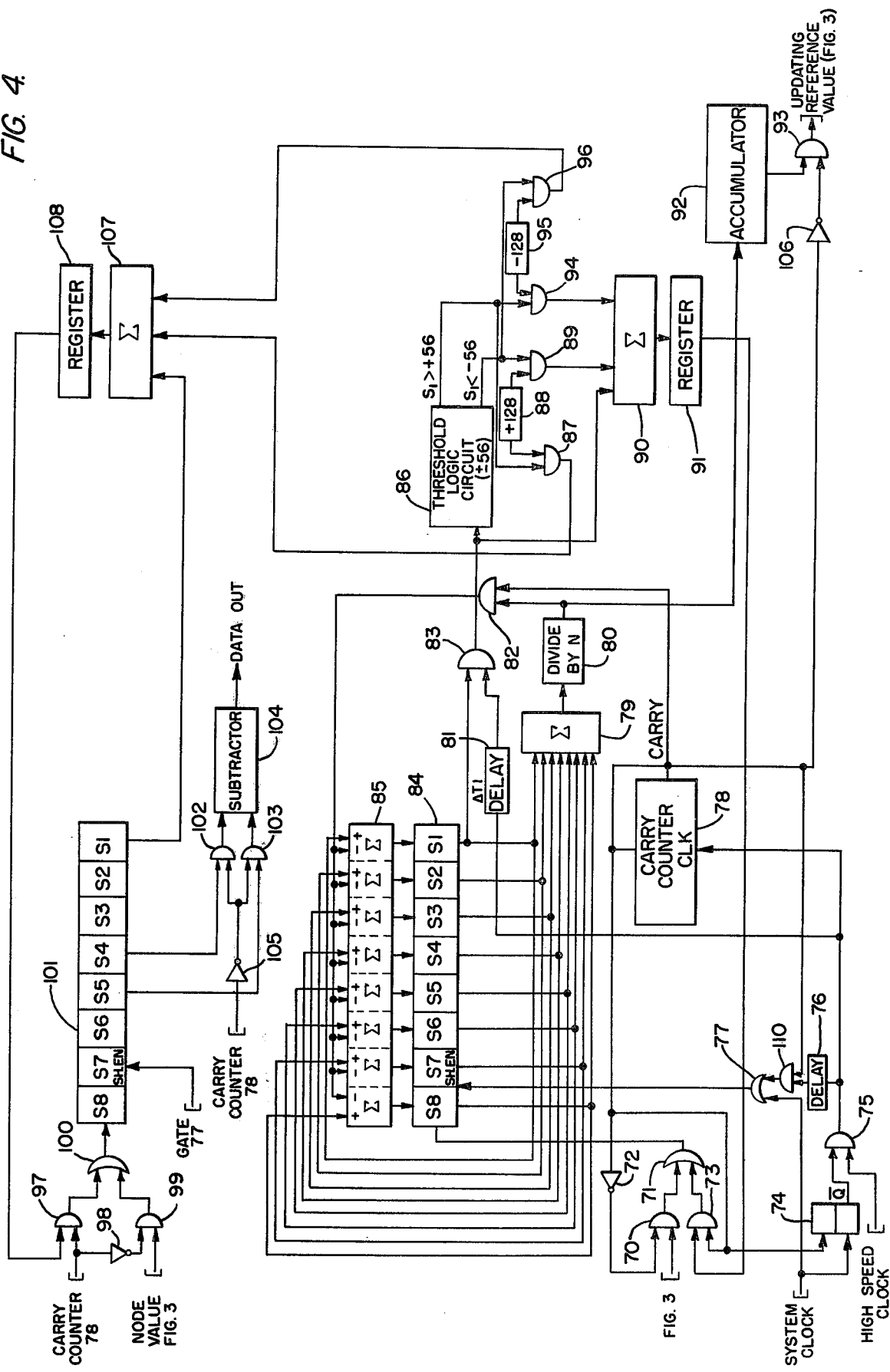

Reference is now had to FIGS. 3 and 4 wherein a detailed circuit configuration for carrying out the functional operations of the overall scheme of FIG. 2 is shown. In order to simplify the drawings, all connections between the various circuit elements have been designated by single conductor lines. Therefore, where inter-element coupling requires a plurality of conductors, such as in the case of multibit or multiline connections, it is to be understood that the single line connections shown in the drawings represent such multiline or multibit conductors. As an example, register 32, shown in FIG. 3, which may be a ten bit register having ten parallel output conductors connecting its respective stages to OR gate circuit 52, has been shown to be connected to OR gate 52 by a single conductor line representing the ten leads required. It is also to be understood that for multiple line or multiple conductor representations just described, the appropriate number of individual gate elements required to effect the coupling of such multiple connections are represented by single gate circuit symbols, such as is the case for OR gate 52.

Referring now to FIG. 3, there are shown the details of a circuitry configuration for carrying out initial phase node and phase error measurements, as well as for storing phase node values representative of the locations of a set of phase nodes that comprise a rotatable phase node plot. To this end, registers 32 - 39, each of which may be a ten bit register, store numerical representations of the locations of the eight phase nodes N0 - N7 on a variable or rotatable reference circle with which successive values of absolute phase measurement for the respective received symbols are compared. For a set of eight equispaced phase nodes N0 - N7 on the circle, the contents of registers 32 - 39 may differ successively by the number 128. The contents of each register are updated, in the manner to be described below, at the end of each symbol processing cycle, by adding to the contents of each register an updating reference value via respective adders 42 - 49. If the updating reference value is a number other than zero, the resulting modification of the contents of registers 32 - 39 effects a rotation of the reference circle by an amount and in a direction governed by the magnitude and sign of the updating reference value.

Also shown in FIG. 3 is another set of registers 32' - 39' which respectively contain fixed numerical codes identifying the various nodes whose locations on the rotatable reference circle are stored in registers 32 - 39. Thus, register 32' stores a number identifying or representing node N0, per se, while corresponding register 32 stores a number representing the location of node N0 on the reference circle. Thus, as a simple illustration, node N0 may be represented by the number zero, stored as 000 000 0000 in register 32'. This ten bit code stored in register 32' is coupled via AND gate 60 and OR gate 68 to the further processing circuitry shown in FIG. 4. Similarly the ten bit codes stored in registers 33' - 39' are coupled to respective AND gates 61 - 67.

In addition to the above described sets of registers, FIG. 3 shows a scanner 31 which, when enabled, successively scans corresponding pairs of registers in each set of registers 32 - 39 and 32' - 39'. The contents of registers 32 - 39 are coupled via OR gate 52 to one input of subtractor 50. The other input of subtractor 50 is coupled to receive each value of absolute phase measurement $\phi sj$, to be compared therein with the reference node values N0 - N7 stored in registers 32 - 39, respectively. As each value $\phi sj$ is clocked into comparison circuit 24, scanner 31 is enabled by an appropriate scan enabling signal and proceeds to scan registers 32' to 39' and thereby sequentially apply their respective contents to be applied to AND gates 60 - 67, respectively. At the same time scanner 31 scans the other set of registers 32 - 39 to sequentially apply the contents of registers 32 - 39 through OR gate 52 to subtractor 50. Subtractor 50 generates an output representative of the phase difference between $\phi sj$ and the values stored in registers 32 - 39, respectively, and applies this phase difference output to threshold circuit 51.

As the contents of respective registers 32 - 39 are sequentially supplied to subtractor 50, threshold circuit 51 compares the difference output of subtractor 50 to the threshold range ±64, corresponding to the halfway numerical values between each node and its adjacent clockwise and adjacent counter-clockwise nodes. The output of threshold circuit 51 is connected as an enabling input for each of gates 60 - 67, and is further connected to a reset input of scanner 31. OR gate 68 couples the output of each of gates 60 - 67 to AND gate 99, shown in FIG. 4. The outputs of subtractor 50 and threshold circuit 51 are also connected to AND gate 53, the output of which is connected to AND gate 70 shown in FIG. 4. If the output of subtractor circuit 50 is outside the threshold range (±64) of the threshold circuit 51, threshold circuit 51 inhibits each of gates 53 and 60 - 67 and permits scanner 31 to proceed to the next register. Upon the difference between the contents of one of the registers 32 - 39 and the absolute phase value $\phi sj$ falling within the range of threshold circuit 51, threshold circuit 51 enables each of gates 53 and 60 - 67 and resets scanner 31. Since each of gates 60 - 67 is enabled, the node identity code contained in whichever register 32' - 39' is presently being addressed by scanner 31 will be coupled via OR gate 68 to gate 99. This effects a coupling of the identity of the node closest to the measured symbol of interest for storage in shift register 101 (FIG. 4). At the same time since gate 53 is enabled, the actual phase difference between the node location value stored in a corresponding one of registers 32 - 39 and the absolute phase $\phi sj$ is supplied to gate 70 for storage in shift register 84 (FIG. 4). Subsequently, after an appropriate interval subsequent to receipt of the reset signal, scanner 31 is reset so that it will begin scanning anew at registers 32 and 32' when enabled by the next scan enable signal. Subtractor 50 and threshold circuit 51 are also reset by appropriate reset lines, not shown, to await a further processing enabling signal for the next phase $\phi_{sj+1}$.

Referring now, to FIG. 4, the processing of phase node estimates and phase difference measurements for successive symbols will be described.

At the termination of the node scanning and phase node decision period, a system clock pulse is supplied to the circuit shown in FIG. 4 to initiate the averaging, adjustment, and node reference value updating operations. The system clock pulse is coupled through OR gate 77 to the shift control input of each of eight symbol stage shift registers 84 and 101. The eight stages of register 84 store the phase deviation values $\Delta \phi_i$ - $\Delta \phi_{i+7}$ for eight successive symbols $S_i$ - $S_{i+7}$. Similarly, register 101 stores the original estimated phase node values for symbols $S_i$ - $S_{i+7}$. The phase deviation and estimated phase node values are coupled through AND gates 70 and 99 and through OR gates 71 and 100 to the serial inputs of registers 84 and 101, respectively. A second input of each of AND gates 70 and 99 is coupled via a respective inverter 72 and 98 to the carry output of carry counter 78. The carry output of counter 78 is also connected to AND gate 82 and via, inverters 105 and 106, to AND gates 93, 102 and 103. In addition, the carry output of counter 78 is connected to AND gates 73 and 97 and the set input of flip-flop 74. The reset input of flip-flop 74 is connected to receive the system clock signal, while its output is connected to one input of AND gate 75. The other input of AND gate 75 receives a high speed system clock for controlling the zero mean averaging process for successive symbols.

The output of AND gate 75 is connected to the clock input of carry counter 78 and through delay 76 and gate 110 and OR gate 77 to the shift control input of registers 84 and 101. The output of AND gate 75 is further coupled via delay circuit 81 to one input of AND gate 83. The other input of AND gate 83 is connected to the lower most symbol stage S1 of register 84, while the output of AND gate 83 is connected to the input of threshold circuit 86 and an input of adder 90.

Threshold circuit 86 compares the phase deviation contents of the S1 stage of register 84 with the phase node change thresholds +56 and −56. If the phase deviation input to threshold circuit 86 exceeds +56, an enabling signal is supplied to AND gates 87 and 94. If the phase deviation input to threshold circuit 86 is less than −56, an enabling signal is supplied to AND gates 89 and 96. If the phase deviation at the input of threshold logic circuit falls in the range −56 to +56, no enabling signal is generated, so that each of AND gates 87, 89, 94, and 96 is disabled. A second input of each of AND gates 87 and 89 is connected to a +128 fixed reference value circuit 88 while a second input of each of AND gates 94 and 96 is connected to a −128 fixed reference value circuit 95. The outputs of AND gates 89 and 94 are connected to adder 90, while the outputs of AND gates 87 and 96 are connected to adder 107. A third input of adder 107 is connected to receive the phase node value contents of stage S1 of register 101. Each of adders 90 and 107 is connected to a respective register 91 and 108, where the summation outputs are temporarily stored. The outputs of these storage register 91 and 108 are coupled to AND gates 73 and 97, the outputs of which are coupled through OR gate 71 and 100, respectively, to the uppermost symbol stages of shift registers 84 and 101, respectively.

The contents of each of the symbol stages S1 - S8 of register 84 are coupled to adder 79 and to respective inputs of the adder stages of adder 85. Adder 79 supplies a total phase deviation number to divide-by-N circuit 80 which, in the present example, divides the total phase deviation contents of shift register 84 by eight and supplies this number to AND gate 82 and accumulator 92. Accumulator 92 keeps track of the total mean deviation accumulated during the phase node decision adjustment process and, at its termination, supplies this number via gate 93 as the updating reference value for registers 32 - 39 which store the phase reference circuit node values.

The output of AND gate 82 is coupled to subtraction inputs of each of the adder stages of adder 85, so that adder 85 adjusts the phase deviation contents of each stage of register 84 by the mean deviation for the eight stored symbol values. The contents of the S4 and S5 stages of register 101 are connected to AND gates 102 and 103, respectively, so that upon the generation of a carry output by carry counter 78, AND gate 102 and 103 will couple the final phase node values for the middle two stored symbols to subtractor 104 from which a phase differential signal representative of transmitted information is derived.

Considering now the zero mean averaging and phase node decision adjustment operation carried out by the circuit implementation shown in FIG. 4, it will be assumed that the values for symbols S1 - S8 occupy the S1 stages of respective registers 84 and 101 with the phase deviation and node estimates from the circuit of FIG. 3 being shifted into the S8 stages of registers 84 and 101 respectively upon the application of system clock pulse to OR gate 77. At the completion of the processing of the previous eight symbols S0 - S7 (So not tabulated) the output of carry counter 78 was low, thereby enabling gates 70 and 99, via inverters 72 and 98, while disabling gates 97 and 73, so that the phase measurements for the next symbol S8 can be shifted into the S8 stage of each register, while the other symbol values are shifted down to the next stage. The contents of the S1 stage of each register are effectively erased, since the summation feedback through gates 73 and 97 is inhibited at the application of the system clock pulse.

Flip-flop 74 may be triggered on the negative edge of input signals, so that, at the end of the clock pulse, flip-flop 74, which had been previously set when the carry counter output went low, is reset, thereby enabling AND gate 75. With AND gate 75 enabled, high speed or high frequency clock pulses are applied to the clock input of carry counter 78 and delay circuits 76 and 81. The time delay of circuit 76 is slightly longer than that provided by delay 81 to permit the phase node threshold decision operation to be completed before shifting the contents of registers 84 and 101. As counter 78 counts the first high speed clock pulse coupled through AND gate 75, its carry output goes from low to high, thereby disabling AND gates 70 and 99, while enabling AND gates 73, 82, and 97.

With the new set of symbol phase deviation numbers contained in stages S1 - S8, using the exemplary values shown in Table 1, adder 79 supplies a total of −128 at its output, which total is divided by eight in divider 80, so that now enabled gate 82 supplies −16 to the subtraction inputs of each of the respective stages of adder 85. Adder 85 subtracts −16 from the contents of each of stages S1 - S8 of shift register 84 and these modified phase deviation values, as tabulated in Table 2, replace the original contents of register 84. The output of adder 79 is now zero since the mean average of the contents of register 84 have been modified by +16. Therefore, the output of divider 80 is also zero.

After a delay sufficient to carry out the above modification of the contents of register 84, delay circuit 81 enables AND gate 83, thereby coupling the contents of the first stage S1 of register 84 to threshold logic circuit 86, and adder 90. From Table 2, it can be seen that the modified phase deviation value (−8) contained in the S1 stage or register 84 does not exceed the threshold limits of threshold logic circuit 86. Therefore, each of AND gates 89 and 94 is disabled so that nothing is added by adder 90 to the (−8) contents of stage S1, so that the phase deviation value −8 is stored in register 91. Similarly, each of AND gates 87 and 96 is disabled so that the phase node estimate value (corresponding to node N0 for symbol S1) stored in stage S1 of register 101 has nothing added to it by adder 107, so that the node value N0 is stored in register 108.

After the above operation, delay circuit 76 couples the first high speed clock pulse via OR gate 77 to the shift control inputs of register 84 and 101 thereby effecting a one symbol right shift and inserting the contents of the S1 stages unmodified, via the adder feedback loops, through AND gates 73 and 97 and OR gates 71 and 100 to the S8 stages, respectively. This completes one averaging and modification sub-cycle, i.e. for one symbol.

Adder 79 again sums the contents of stages S1 - S8 producing a zero output since, even through the order of the contents has been shifted, the sum of the modified values remains unchanged. This sequence of events, described above for the comparison of the phase deviation value for symbol S1, is repeated for symbol S2, and continues sequentially, symbol by symbol, for symbol S1 through symbol S8.

Now, as will be recalled from the values tabulated in Table 2, the phase deviation for symbol S4 falls outside the range of threshold circuit 86. Therefore, when the phase deviation for symbol S4 is read out of stage S1 of register 84, each of AND gates 87 and 94 will be enabled, so as to add −128 to the phase deviation value for symbol S4 contained in stage S1 of register 84 and supplied to adder 90, while adding +128 to the original phase node estimate value supplied to adder 105 from stage S1 of register 101. At the next shift pulse supplied to registers 84 and 101 from OR gate 77, the total of the contents of register 84 will have been reduced by 128 so that adder 79 and divider 80 supply the mean value 106 to adder 85 via gate 82. The contents of register 84 now contain the values shown in Table 3, with the order of the symbols being such that the S4 symbol newly modified phase deviation value of −46 is inserted in stage S8, while in register 101 stage S8 contains the node value for node N5 as the changed node decision for symbol S4. With the next high speed clock pulse, the above process is repeated for the remaining symbols S5, S6, S7, S8, and then starts again at S1 . . ., until counter 78 has reached a count of sixty-five whereupon a carry is generated, inhibiting further operation of the phase deviation modification and node decision changing circuitry. The sixty-five count is necessary to ensure a complete averaging of the phase deviation values, over the entire sequence, for each node. Namely, a change in one node decision may affect the phase deviation value for each symbol in the series, so that N times N or an eight times eight number of sum-cycles, plus one additional clock pulse to effect a final right shift of registers 84 and 101 is required.

At the generation of a carry, flip-flop 74 is reset, preventing further high speed clock pulses from being counted by counter 78 until the next system clock pulse. Also, AND gates 93, 102, and 103 become enabled while AND gate 110 is disabled, preventing the 65th high speed pulse from gate 75 from shifting the contents of registers 84 and 101. Gate 93 supplies the total accumulation of mean phase deviations to adders 42 through 47 (FIG. 3), (the total in the above example is the number −32). Also, subtractor 104 generates an output representative of the phase difference between the node values for symbol S4 and S5 ($5\pi/4$), corresponding to transmitted information. The circuit now waits for the next system clock pulse for loading new node and phase deviation values for the next symbol S9 and eventually determines the difference between finalized node values for symbols S5 and S6 based upon the zero mean square average of the phase deviations for the sequence of symbols S2 through S9.

As will be appreciated from the foregoing description of the invention, while the novel technique for combatting phase jitter in a multiple phase communication system has been described for eight phases and with eight successive samples used for zeroing the mean square average of the phase deviations, the invention can be used with any number of phase nodes for differential MPSK signals and any number of received samples to be averaged. It should also be noted that rotation of the phase node reference circle by an integral number of phase nodes has no effect on the final information symbols selected, due to the differential nature of the transmission. Hence, phase node slippages do not present a difficulty.

While I have shown and described an embodiment in accordance with the present invention, it is understood that the same is not limited thereto, but is susceptible of numerous changes and modifications as known to a person skilled in the art and I therefore do not wish to be limited to the details shown and described herein but intend to cover all such changes and modifications as are obvious to one or ordinary skill in the art.

I claim:

1. A method of combatting the effects of phase distortion in a multiple phase communication system wherein successively received phase symbols, the difference between adjacent ones of which represents transmitted information, may be shifted from their originally transmitted phase values, comprising the steps of:
   (a) measuring the phase of each received symbol relative to a set of reference phases representative of each of the respective phase symbols which may have been transmitted;
   (b) generating, for each received symbol, a first signal representative of the reference phase to which the received symbol is closest and a second signal representative of the phase difference between the phase of the received symbol and its closest reference phase;
   (c) selectively shifting each reference phase in said set of reference phases and selectively modifying the first signals to those representative of adjacent reference phases so as to minimize the mean square phase error for a prescribed number of successive ones of said second signals; and
   (d) differentially combining the first signals of the adjacent symbols of a selected pair of symbols in said sequence to derive a symbol phase difference signal representative of transmitted information.

2. A method according to claim 1, wherein said sequence is comprised of n successive symbols $S_i$ - $S_{i+n-1}$, said selected pair of symbols being the symbols $(S_{i+n-1})/2$ and $(S_{i+n+1})/2$.

3. A method according to claim 1, wherein the set of phase references with which a respective phase symbol $S_j$ is measured is that resulting from the shifting of said phase references for the immediately preceding phase symbols $S_{j-1}$ through $S_{j-n}$, said phase symbol $S_j$ then becoming an end symbol in the sequence of n symbols for which steps (c) and (d) are carried out.

4. A method according to claim 3, wherein said sequence is comprised of n successive symbols $S_i$ through $S_{i+n-1}$, said selected pair of symbols being the symbols $(S_{i+n-1})/2$ and $(S_{i+n+1})2$.

5. A method of combatting the effects of phase distortion in a multiple phase communication system wherein successively received phase symbols, the difference between adjacent ones of which represents transmitted information, may be shifted from their originally transmitted phase values, comprising the steps of:
   (a) measuring the phase of each received symbol relative to a set of reference phases representative of each of the respective phase symbols which may have been transmitted;
   (b) generating, for each received symbol, a first signal representative of the reference phase to which the received symbol is closest, and a second signal representative of the phase difference between the phase of the received symbol and its closest reference phase;
   (c) modifying each second signal for a sequence of a prescribed number n of received symbols $S_i$ through $S_{i+n-1}$ by the mean average of the phase differences for each of the second signals in said sequence;
   (d) comparing each of the modified second signals in said sequence with a prescribed phase error threshold and selectively modifying each first signal to a value representative of an adjacent reference phase depending upon whether or not the modified second signal exceeds said phase error threshold;
   (e) selectively adjusting the modified second signal in accordance with the phase difference resulting from the modification of the first signal of that phase symbol to which the modified second signal corresponds;

(f) repeating steps (c) through (e) for each of the symbols in said sequence until the mean average of the values of each of said second signals after step (e) is such that none of the modified second symbols in the sequence exceeds said phase error threshold; and (g) modifying each of the references phases of said set by an amount corresponding to the accumulation of each mean average obtained in step (c) and thereby establish said set of reference phases at values by which the mean square phase error of each symbol relative to its closest reference phase is minimized.

6. A method according to claim 5, further comprising the step of (h) differentially combining the first signals of the adjacent symbols of a selected pair of symbols in said sequence to derive a symbol phase difference signal representative of transmitted information.

7. A method according to claim 6, wherein said sequence is comprised of n successive symbols, said selected pair of symbols being the symbols $(S_{i+n-1})/2$ and $(S_{i+n+1})/2$.

8. A method according to claim 5, wherein the set of phase references with which a respective phase symbol $S_j$ is measured is that resulting from the modification of said phase references for the immediately preceding phase symbols $S_{j-1}$ through $S_{j-n}$, said phase symbol $S_j$ then becoming an end symbol in the sequence of n symbols for which steps (c) through (g) are carried out.

9. A method according to claim 8, further comprising the step of (h) differentially combining the first signals of the adjacent symbols of a selected pair of symbols in said sequence to derive a symbol phase difference signal representative of transmitted information.

10. A method according to claim 9, wherein said sequence is comprised of n successive symbols, said selected pair of symbols being the symbols $(S_{i+n-1})/2$ and $(S_{i+n+1})/2$.

11. A method according to claim 5, wherein step (c) comprises subtracting from each second signal in said sequence said mean average of the phase differences.

12. A method according to claim 11, wherein step (e) comprises, upon said modified second signal exceeding said phase error threshold, adding to said modified second signal a number, the magnitude of which is representative of the spacing between adjacent reference phases, and the polarity of which is opposite to the polarity of the exceeded phase error threshold.

13. A method according to claim 12, wherein step (g) comprises subtracting said accumulation corresponding amount from each reference phase.

14. A system for combatting the effects of phase distortion in a multiple phase communication system wherein successively received phase symbols, the difference between adjacent ones of which represents transmitted information, may be shifted from their originally transmitted phase values, comprising:

first means for measuring the phase of each received symbol relative to a set of reference phases representative of each of the respective phase symbols which may have been transmitted;

second means, coupled to said first means, for generating, for each received symbol, a first signal representative of the reference phase to which the received symbol is closest and a second signal representative of the phase difference between the phase of the received symbol and its closest reference phase;

third means, coupled to said first and second means, for selectively shifting each reference phase in said set of reference phases and selectively modifying the first signals to those representative of adjacent reference phases so as to minimize the mean square phase error for a prescribed number of successive ones of said second signals; and fourth means for differentially combining the first signals of the adjacent symbols of a selected pair of symbols in said sequence to derive a symbol phase difference signal representative of transmitted information.

15. A system according to claim 14, wherein said sequence is comprised of n successive symbols $S_i$ through $S_{i+n-1}$, said selected pair of symbols being the symbols $(S_{i+n-1})/2$ and $(S_{i+n+1})/2$.

16. A system according to claim 14, wherein the set of phase references with which a respective phase symbol $S_j$ is measured by said first means is that resulting from the shifting of said phase references for the immediately preceding phase symbols $S_{j-1}$ through $S_{j-n}$, said phase symbol $S_j$ then becoming an end symbol in the sequence of n symbols processed by said second, third, and fourth means.

17. A system according to claim 16, wherein said sequence is comprised of n successive symbols $S_i$ through $S_{i+n-1}$, said selected pair of symbols being the symbols $(S_{i+n-1})/2$ and $(S_{i+n+1})/2$.

18. A system for combatting the effects of phase distortion in a multiple phase communication system wherein successively received phase symbols, the difference between adjacent ones of which represents transmitted information, may be shifted from their originally transmitted phase values, comprising:

first means for measuring the phase of each received symbol relative to a set of reference phases representative of each of the respective phase symbols which may have been transmitted;

second means for generating, for each received symbol, a first signal representative of the reference phase to which the received symbol is closest, and a second signal representative of the phase difference between the phase of the received symbol and its closest reference phase;

third means for modifying each second signal for a sequence of a prescribed number n of received symbols $S_i$ through $S_{i+n-1}$ by the mean average of the phase differences for each of the second signals in said sequence;

fourth means for comparing each of the modified second signals in said sequence with a prescribed phase error threshold and selectively modifying each first signal to a value representative of an adjacent reference phase depending upon whether or not the modified second signal exceeds said phase error threshold;

fifth means for selectively adjusting the modified second signal in accordance with the phase difference resulting from the modification of the first signal of that phase symbol to which the modified second signal corresponds;

sixth means for causing said third, fourth, and fifth means to repeat their respective operations for each of the symbols in said sequence until the mean average of the values of each of said second signals resulting from the operation of said fifth means is such that none of the modified second symbols in the sequence exceeds said phase error threshold; and seventh means for modifying each of the references phases of said set by an amount corresponding to the accumulation of each means average obtained by said third means and thereby establish said set of reference phases at values by which the mean square phase error of each symbol relative to its closest reference phase is minimized.

19. A system according to claim 18, further comprising:

eighth means for differentially combining the first signals of the adjacent symbols of a selected pair of symbols in said sequence to derive a symbol phase difference signal representative of transmitted information.

20. A system according to claim 19, wherein said sequence is comprised of n successive symbols, said selected pair of symbols being the symbols $(S_{i+n-1})/2$ and $(S_{i+n+1})/2$.

21. A system according to claim 18, wherein the set of phase references with which a respective phase symbol $S_j$ is measured is that resulting from the modification of said phase references for the immediately preceding phase symbols $S_{j-1}$ through $S_{j-n}$, said phase symbol $S_j$ then becoming an end symbol in the sequence of n symbols processed by said third, fourth, and fifth means.

22. A system according to claim 21, further comprising:

eighth means for differentially combining the first signals of the adjacent symbols of a selected pair of symbols in said sequence to derive a symbol phase difference signal representative of transmitted information.

23. A system according to claim 22, wherein said sequence is comprised of n successive symbols, said selected pair of symbols being the symbols $(S_{i+n-1})/2$ and $(S_{i+n+1})/2$.

24. A system according to claim 18, wherein third means comprises means for subtracting from each second signal in said sequence said mean average of the phase differences.

25. A system according to claim 24, wherein fifth means comprises means, responsive to said modified second signal exceeding said phase error threshold, for adding to said modified second signal a number, the magnitude of which is representative of the spacing between adjacent reference phases, and the polarity of which is opposite to the polarity of the exceeded phase error threshold.

26. A system according to claim 25, wherein seventh means comprises means for subtracting said accumulation corresponding amount from each reference phase.

* * * * *

UNITED STATES PATENT AND TRADEMARK OFFICE
CERTIFICATE OF CORRECTION

PATENT NO. : 4,146,841
DATED : March 27, 1979
INVENTOR(S) : Daniel D. McRae

It is certified that error appears in the above-identified patent and that said Letters Patent are hereby corrected as shown below:

In the specification column 1 between lines 3 and 4 insert the following paragraph:

The United States Government has rights in this invention pursuant to Contract No. F 30602-75-C0129 awarded by the Department of the Air Force.

Signed and Sealed this

Twenty-eighth Day of August 1979

[SEAL]

Attest:

Attesting Officer

LUTRELLE F. PARKER
Acting Commissioner of Patents and Trademarks